(12) United States Patent
Nagata

(10) Patent No.: US 8,996,799 B2
(45) Date of Patent: Mar. 31, 2015

(54) CONTENT STORAGE SYSTEM WITH MODIFIED CACHE WRITE POLICIES

(75) Inventor: Yu Nagata, Tokyo (JP)

(73) Assignee: Nec Corporation, Tokyo (JP)

( * ) Notice: Subject to any disclaimer, the term of this patent is extended or adjusted under 35 U.S.C. 154(b) by 375 days.

(21) Appl. No.: 13/148,895

(22) PCT Filed: Dec. 16, 2009

(86) PCT No.: PCT/JP2009/006902
§ 371 (c)(1),
(2), (4) Date: Aug. 10, 2011

(87) PCT Pub. No.: WO2010/106604
PCT Pub. Date: Sep. 23, 2010

(65) Prior Publication Data
US 2011/0314205 A1 Dec. 22, 2011

(30) Foreign Application Priority Data
Mar. 17, 2009 (JP) .................................. 2009-63904

(51) Int. Cl.
G06F 12/02 (2006.01)
G06F 3/06 (2006.01)

(52) U.S. Cl.
CPC ............... *G06F 3/065* (2013.01); *G06F 3/061* (2013.01); *G06F 3/0641* (2013.01); *G06F 3/068* (2013.01); *G06F 3/0688* (2013.01); *G06F 3/0689* (2013.01); *G06F 3/0685* (2013.01)
USPC .................... 711/113; 711/118; 711/E12.021

(58) Field of Classification Search
None
See application file for complete search history.

(56) References Cited

U.S. PATENT DOCUMENTS

| 6,742,084 | B1 * | 5/2004 | Defouw et al. | 711/133 |
| 2004/0215718 | A1 * | 10/2004 | Kazmi et al. | 709/203 |
| 2005/0144172 | A1 * | 6/2005 | Kilian et al. | 707/10 |
| 2005/0210202 | A1 * | 9/2005 | Choubal et al. | 711/138 |

(Continued)

FOREIGN PATENT DOCUMENTS

| JP | 2005235171 A | 9/2005 |
| JP | 2008097225 A | 4/2008 |

(Continued)

OTHER PUBLICATIONS

Norman P. Jouppi, "WRL Research Report, Cache Write Polices and Performance", Dec. 1991.*
International Search Report for PCT/JP2009/006902 mailed Jan. 26, 2010.

*Primary Examiner* — Charles Rones
*Assistant Examiner* — Tian-Pong Chang
(74) *Attorney, Agent, or Firm* — Sughrue Mion, PLLC

(57) ABSTRACT

A storage system includes a first storage device, and a second storage device retrieving stored data at higher speeds than the first storage device. The storage system further includes a feature calculation unit calculating feature data based on a data content of storage target data, a data management unit storing the storage target data and managing a storing position thereof based on the feature data calculated from the storage target data, and a duplication determination unit determining whether or not the same storage target data as the storage target data to be newly stored is already stored in the first storage device. In a case that the same storage target data as the storage target data to be newly stored is already stored in the first storage device, the data management unit stores the storage target data already stored in the first storage device into the second device.

11 Claims, 8 Drawing Sheets

(56) References Cited

U.S. PATENT DOCUMENTS

2006/0053254 A1* 3/2006 Van Eijndhoven ............ 711/122
2007/0050491 A1* 3/2007 Kataoka et al. ............... 709/223
2007/0266059 A1* 11/2007 Kitamura ...................... 707/204
2009/0049234 A1* 2/2009 Oh et al. ........................ 711/103

FOREIGN PATENT DOCUMENTS

| JP | 4146380 B | 9/2008 |
| JP | 2009020858 A | 1/2009 |
| JP | 2009048613 A | 3/2009 |

* cited by examiner

| CONTENT ADDRESS | STORING POSITION |
|---|---|
| CA1 | ..... |
| CA2 | ..... |
| CA3 | ..... |
| | |

(B)

| CONTENT ADDRESS | DUPLICATION NUMBER |
|---|---|
| CA1 | 2 |
| CA2 | 15 |
| CA3 | 8 |
| | |

Fig.3
(A)
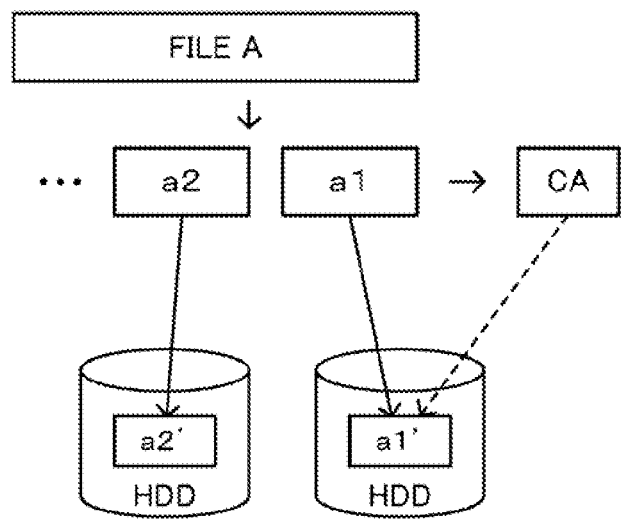
(B)
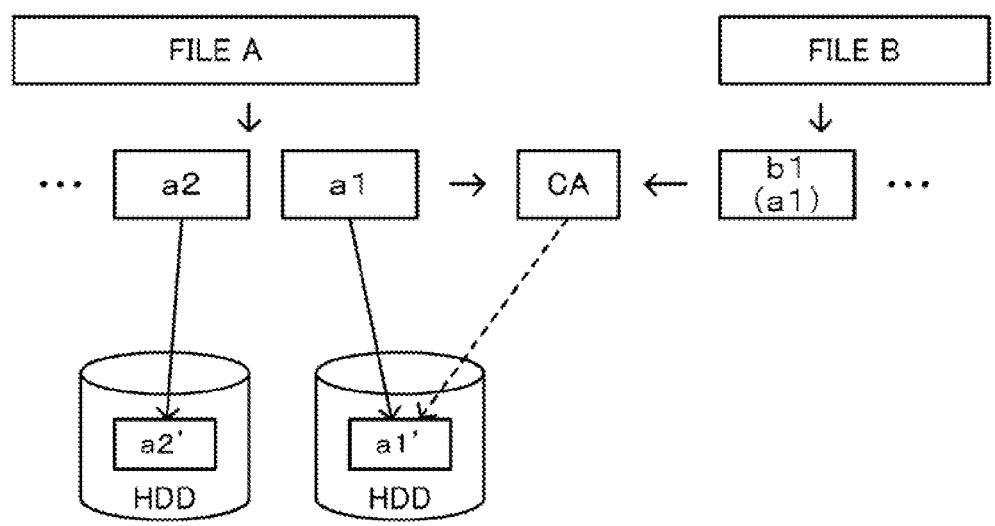

Fig.4
(A)
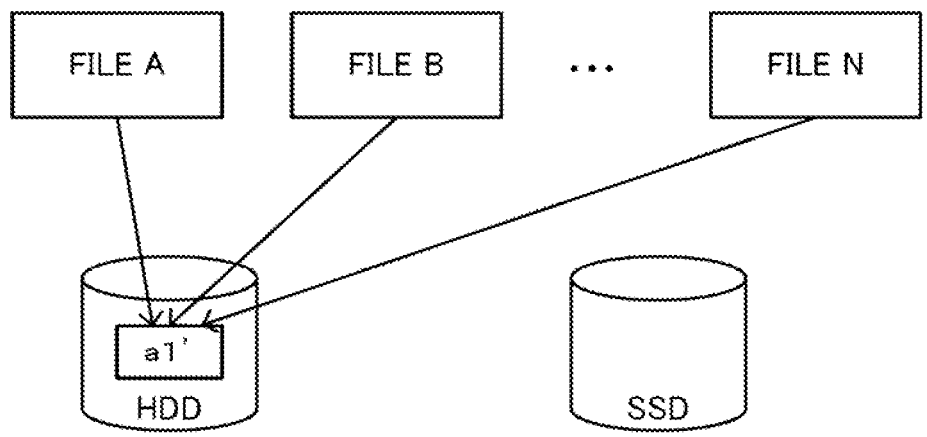
(B)
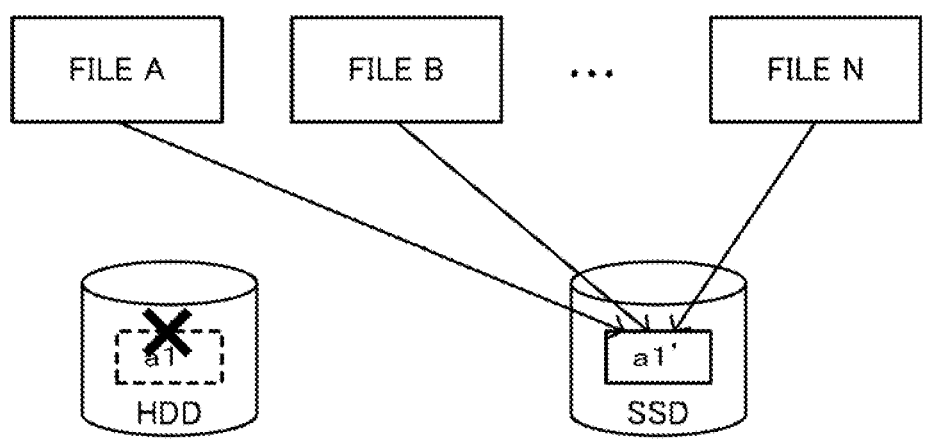

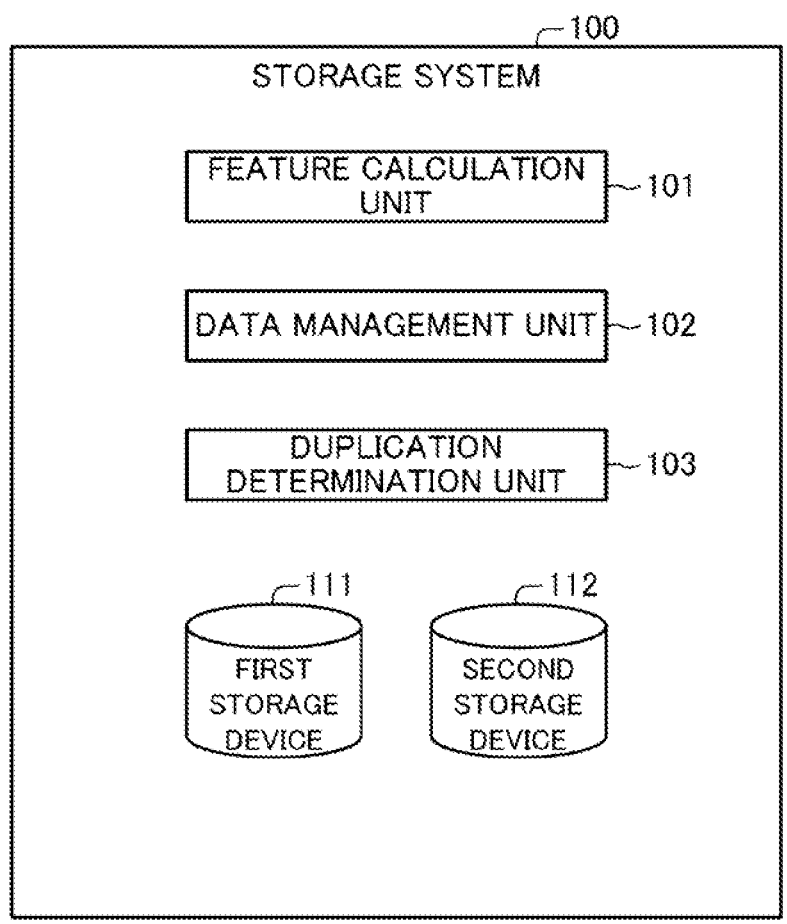

CONTENT STORAGE SYSTEM WITH MODIFIED CACHE WRITE POLICIES

TECHNICAL FIELD

The present invention relates to a storage system, and specifically, relates to a storage system of a content address type that manages a storing position according to the content of stored data.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost for storage devices. In addition, it is required that data can be retrieved later with ease. As a result, such a storage system is desired that is capable of automatically realizing increase of the storage capacity and performance thereof, that eliminates duplicate storage to reduce the cost for storage, and that has high redundancy.

In a recently major storage system, when files are sequentially written therein, the files are located in order as far as possible on a hard disk that actually stores data. Thus, it is possible to decrease the number of times of seeking of the hard disk at the time of writing and reading, and it is possible to realize a high-speed recording and reproducing process. Moreover, since the same files or related data are written in order, there is no unused storage region between the stored data, and it is possible to effectively use a storage region.

On the other hand, in recent years, a content address storage system has been developed as shown in Patent Document 1 for the purpose of more effectively using a storage region. This content address storage system divides a file into a plurality of blocks and records them on a hard disk. At this moment, the storage system specifies a located position of a data block on the hard disk based on the data content of the data block. To be specific, the storage system generates a hash value specified according to the data content of a data block, and manages a storing position by this hash value. Therefore, by using a sequence of hash values configuring the file, it is possible to retrieve a series of data of the file.

Since the content address storage system manages data by using hash values according to data contents as described above, there is no need to store data blocks of the same content in duplicate, and it is possible to reduce the storage amount. For example, assuming a plurality of files have similar contents, it is highly possible that the files contain data blocks of the same content. In the case of storing these files into the content address storage system, the content address storage system compares the hash values of the data blocks to be stored with the hash values of data blocks having already been stored. In a case that the same hash value exists, it appears that a data block of the same content is already stored. In this case, by referring to and managing a content address specifying the storing position of the data block as that of a data block to be stored, it is possible to limit duplicate storage of the data block. Then, in a case that a data block of the same content is stored, by referring to a content address of a data block having already been stored, it is possible to further limit duplicate storage, and it is possible to realize efficient use of a storage region.

[Patent Document 1] Japanese Unexamined Patent Application Publication No. JP-A 2005-235171
[Patent Document 2] Japanese Patent Publication No. 4146380

However, in a case that a data block to be stored is a duplicate, the content address storage system described above does not store the data block, so that there is a case that data blocks within a file are not located in order. In particular, in a case that data blocks of a small data size are generated in random positions among other files having already been stored, the data blocks within the files may be fragmentized. Then, a problem arises in which it takes much time to seek on a hard disk at the time of writing and retrieving, recording and reproduction of data at high speeds cannot be realized, and the performance decreases.

Further, for the purpose of increasing the performance of recording and reproducing data described above, it can be considered to periodically execute rearrangement of stored data. For example, Patent Document 2 describes relocation of data by a disk array device. However, in the case of executing relocation of such data, processing load on the storage system increases, and the performance of the system still decreases.

On the other hand, in recent years, an SSD (Solid State Drive) is also used as a storage medium. The SSD does not need a seek time, and has an excellent performance of reading at random. Therefore, there is a possibility that the aforementioned problem of decrease of performance can be solved by changing a storage medium from the hard disk to the SSD. However, since the unit cost of the storage capacity of the SSD is considerably expensive when compared with the hard disk. Therefore, there arises a problem in which the cost for storage capacity increases.

SUMMARY

Accordingly, an object of the present invention is to provide a storage system that can solve the aforementioned problem of increase of the cost and decrease of the performance.

In order to achieve the object, a storage system of an embodiment of the present invention includes a first storage device and a second storage device configured to retrieve stored data at a higher speed than the first storage device. The storage system also includes: a feature calculation unit configured to calculate feature data based on a data content of storage target data; a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data. In the storage system, the data management unit is configured to, in a case that the same storage target data as the storage target data to be newly stored is already stored in the first storage device, store the storage target data already stored in the first storage device, into the second storage device.

Further, in a storage device of another embodiment of the present invention, a first storage device and a second storage device configured to retrieve stored data at a higher speed than the first storage device are connected. The storage device includes: a feature calculation unit configured to calculate feature data based on a data content of storage target data; a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data. In the storage device, the data management unit is configured to, in a case that the same storage target data as the storage target data to be newly stored is already stored in the first storage device, store the storage target data already stored in the first storage device, into the second storage device.

Further, a computer program of another embodiment of the present invention includes instructions for causing an information processing device in which a first storage device and a second storage device configured to retrieve stored data at a higher speed than the first storage device are connected, to realize: a feature calculation unit configured to calculate feature data based on a data content of storage target data; a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data. In the computer program, the data management unit is configured to, in a case that the same storage target data as the storage target data to be newly stored is already stored in the first storage device, store the storage target data already stored in the first storage device, into the second storage device.

Further, a data management method of another embodiment of the present invention includes: calculating feature data based on a data content of storage target data; and storing the storage target data into a first storage device or a second storage device configured to retrieve stored data at a higher speed than the first storage device, and managing a storing position of the storage target data based on the feature data calculated from the storage target data. The data management method also includes: in the case of newly storing the storage target data, calculating feature data based on a data content of the new storage target data, determining whether or not the same storage target data as the storage target data to be newly stored is already stored in the first storage device based on this feature data and, in a case that the same storage target data as the storage target data to be newly stored is already stored in the first storage device, storing the storage target data already stored in the first storage device into the second storage device.

With the configurations as described above, the present invention can provide a storage system that is low-cost and capable of increasing the performance.

BRIEF DESCRIPTION OF DRAWINGS

FIG. 2 is a view showing an example of data stored in the storage system disclosed in FIG. 1

FIG. 3 is an explanation view showing an aspect of a data storing process in the storage system disclosed in FIG. 1

FIG. 4 is an explanation view showing an aspect of a data storing process in the storage system disclosed in FIG. 1;

FIG. 8 is a function block diagram showing a configuration of a storage system in a second exemplary embodiment.

EXEMPLARY EMBODIMENTS

<First Exemplary Embodiment>

Figure 1:
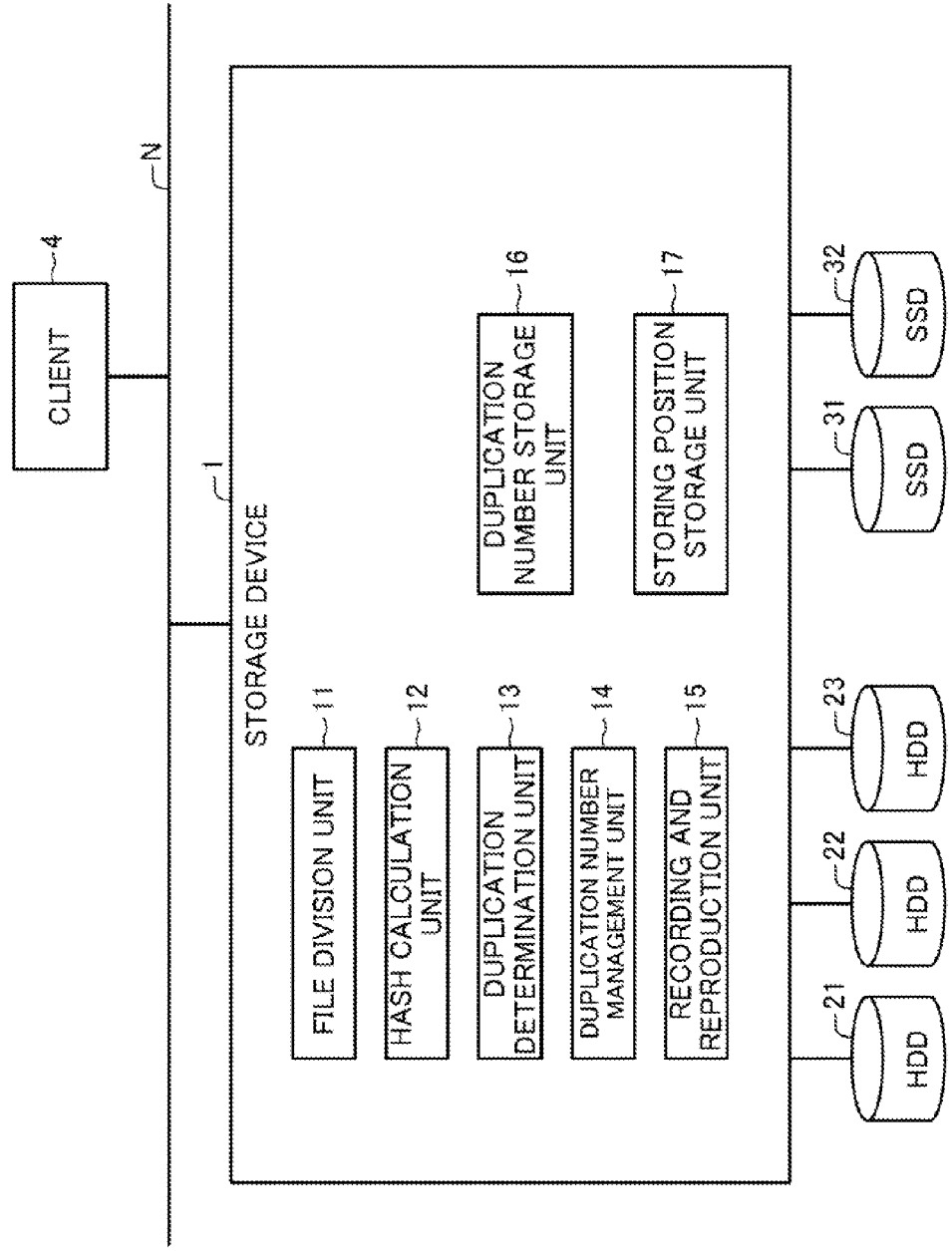
FIG. 1 is a function block diagram showing a configuration of a storage system in a first exemplary embodiment 1.
Figure 5:
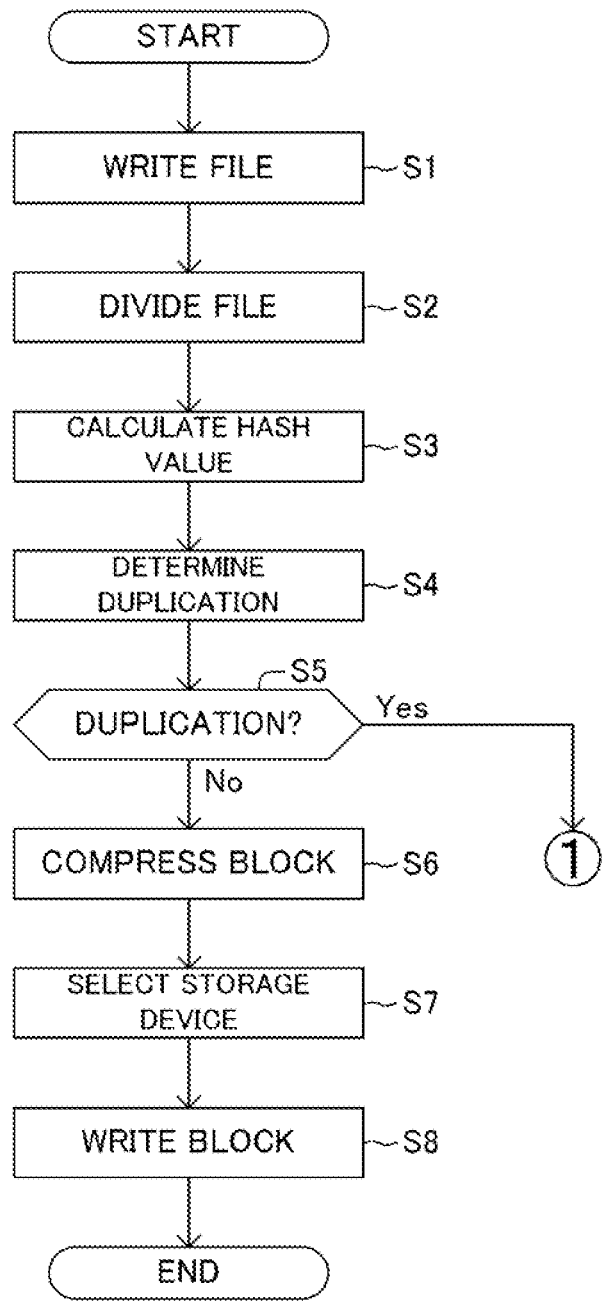
FIG. 5 is a flowchart showing an operation of the storage system disclosed in FIG. 1.
Figure 6:
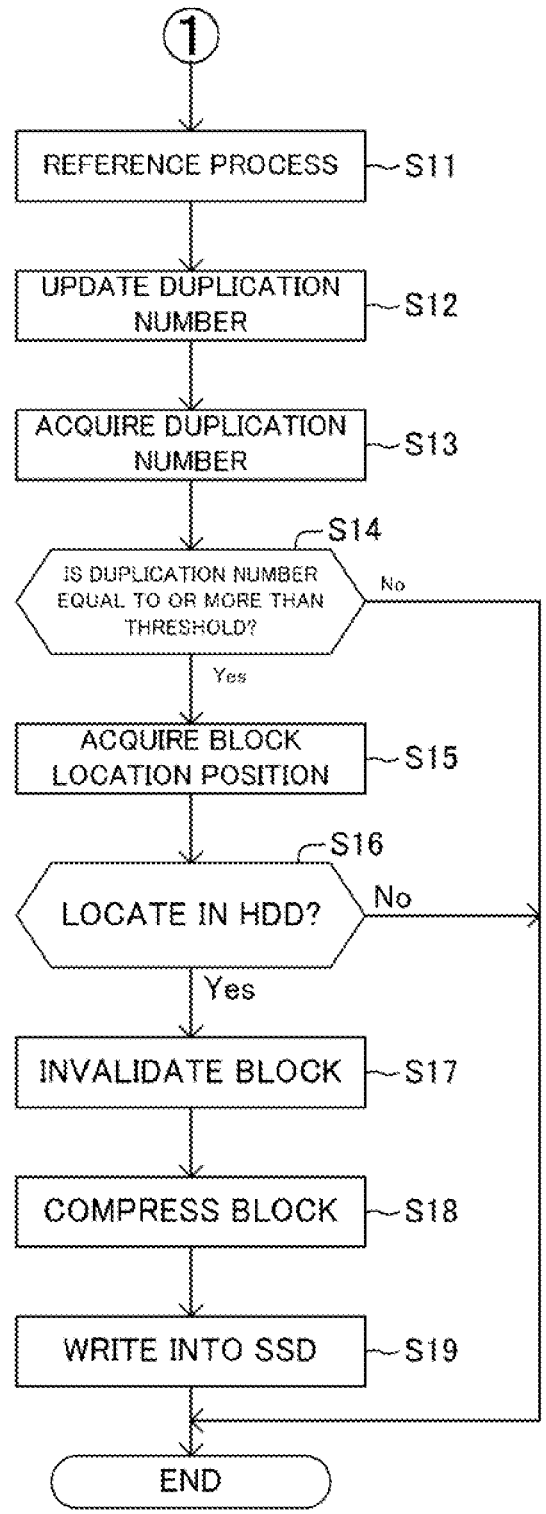
FIG. 6 is a flowchart showing an operation of the storage system disclosed in FIG. 1.
Figure 7:
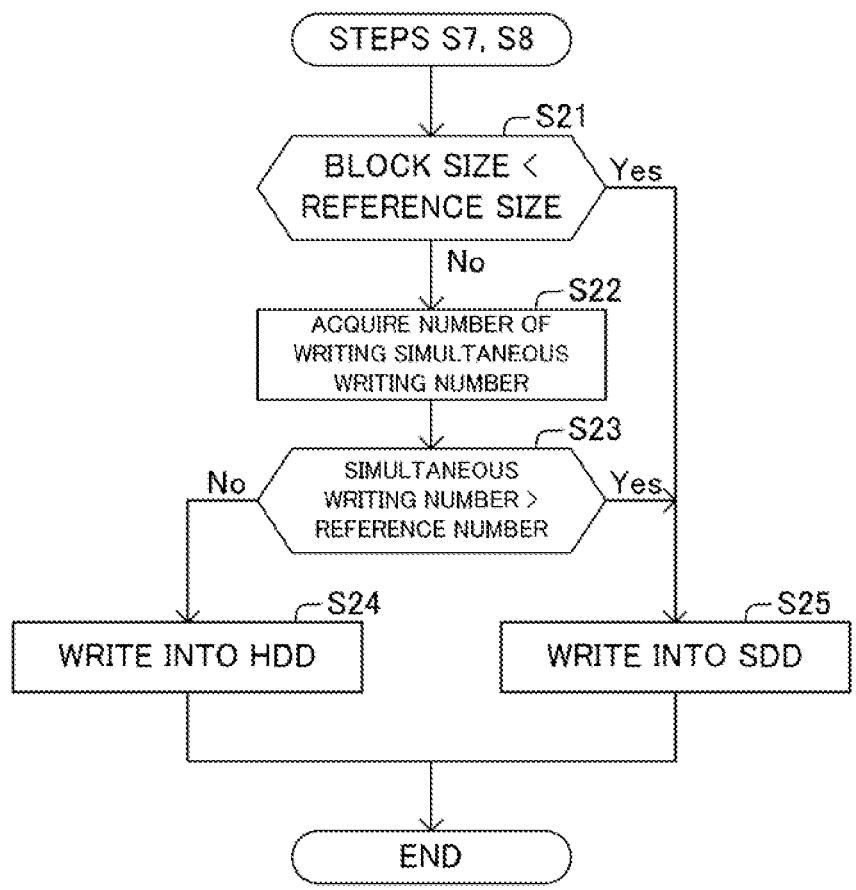
FIG. 7 is a flowchart showing an operation of the storage system disclosed in FIG. 1.

A first exemplary embodiment of the present invention will be described with reference to FIGS. 1 to 7. FIG. 1 is a function block diagram showing a configuration of a storage system. FIG. 2A is a view showing an example of data stored in a storing position storage unit, and FIG. 2B is a view showing an example of data stored in a duplication number storage unit. FIGS. 3A to 4B are views showing an aspect of a data storing process in the storage system. FIGS. 5 and 7 are flowcharts showing an operation of the storage system.

[Configuration]

A storage system of this exemplary embodiment includes a storage device 1 connected with a computer of a client 4 via a network N, and a plurality of storage devices 21, 22, 23, 31 and 32 connected to the storage device 1. The client 4 is a general information processing device, which writes a file into the storage device 1 and retrieves a file from the storage device 1 via the network N.

The plurality of storage devices 21, 22, 23, 31 and 32 are hard disk drives (HDD) 21, 22, 23 serving as first storage devices, and solid state drives (SSD) 31, 32 that are drives using flush memories serving as second storage devices. Unlike the HDD, the SSD does not have a disk, and therefore, the SSD retrieves stored data at higher speeds than the HDD. Although FIG. 1 shows an example of including the three HDDs 21, 22 and 23 and the two SSDs 31 and 32, the numbers of the respective drives are not limited to those described above. Moreover, the HDD and the SSD may be other storage devices, respectively.

The storage device 1 is a general information processing device, which operates so as to write a file into the HDD or the SSD and retrieve a file from the HDD or the SSD in response to a request from the client 4. The storage device 1 includes a file division unit 11, a Hash calculation unit 12, a duplication determination unit 13, a duplication number management unit 14 and a recording and reproducing unit 15, which are structured by installing a program into an arithmetic device included therein. The abovementioned program is provided to the storage device 1 in a state of being stored in a storage medium such as a CD-ROM. Alternatively, the program may be stored in another server computer on the network and provided to the storage device 1 from the other server computer via the network.

Further, the storage device 1 is equipped with a storage device such as a flash memory or another hard disk, and equipped with a duplication number storage unit 16 and a storing position storage unit 17. The respective configurations will be described below in detail.

The file division unit 11 divides a file to be stored into block data (storage target data) to be actually stored into the HDDs 21 to 23 and the SSDs 31 to 32. For example, as shown in FIG. 3A, the file division unit 11 divides a file A into a plurality of block data a1, a2, and so on. At this moment, the file division unit 11 divides the file into block data of a predetermined data size or block data of any data size according to other stored data. There is a case that a file of an initially small data size is not divided, and the file can become such block data that the file is storage target data.

The Hash calculation unit 12 (a feature calculation unit) calculates a Hash value of the block data obtained by division.

A Flash value is a value obtained by summarizing or converting data of the block data into data of a fixed length by a predetermined Hash function. Therefore, a Hash value becomes feature data based on the data content of block data, and is likely to become a unique value to the block data. As described later, this Hash value is used for determination of duplication of block data having already been stored, and is also used as address data referring to the storing position of block data.

The duplication determination unit 13 determines by using the Hash value whether or not data of the same content as the block data is stored in the HDD 21 to 23 or the SSD 31 to 32. To be specific, the duplication determination unit 13 checks whether or not the Hash value of block data to be newly stored is already stored in, for example, the content addresses of the storing position storage unit 17 described later within the storage system. Then, in a case that the same Hash value is already stored, the duplication determination unit 13 determines that block data of the same content is already stored in the HDD 21 to 23 or the SSD 31 to 32. On the other hand, in a case that the same Hash value is not stored, the duplication determination unit 13 determines that block, data of the same content is not stored in the HDD 21 to 23 or the SSD 31 to 32 yet. Then, the duplication determination unit 13 notifies the determination result to the duplication number management unit 14 and the recording and reproducing unit 15.

The recording and reproducing unit 15 (a data management unit) controls writing and retrieving of block data into or from the HDDs 21 to 23 or the SSDs 31 to 32 in the storage system. As a basic function, firstly, in a case that the duplication determination unit 13 determines that a Hash value of block data to be newly stored is not stored, the recording and reproducing unit 15 compresses the block data and stores into the HDD 21 or the like or the SSD 31 or the like. Then, the recording and reproducing unit 15 refers to and manages a position in which the block data is stored, by a content address using the Hash value of the block data.

For example, as shown in FIG. 3A, upon storing compressed block data a1' obtained by compressing the block data a1 into the HDD, the recording and reproducing unit 15 sets so as to refer to this storing position by a content address CA using a Hash value of the block data a1. That is to say, the recording and reproducing unit 15 sets the content address CA corresponding to the block data a1. Then, as shown in FIG. 2A, the recording and reproducing unit 15 relates data that specifies the storing position of the compressed block data a1' with a content address CA referring to the data and stores it into the storing position storage unit 17. Thus, when retrieving the block data a1 later, it is possible, by referring to the storing position stored in relation with the content address CA specifying the block data a1, to retrieve the block data a1 (the compressed block data a1').

Further, as a basic function of the recording and reproducing unit 15, in a case that the duplication determination unit 13 determines that a Hash value of block data to be newly stored is stored, the recording and reproducing unit 15 does not newly store the block data, and executes a process of referring to block data of the same content stored in the HDD 21 or the like or the SSD 31 or the like. That is to say, by referring to a content address of the same value as block data of the same content having already been stored, the recording and reproducing unit 15 considers this block data having already been stored as block data to be newly stored.

For example, as shown in FIG. 3B, it is assumed that block data b1 of a file B to be newly stored is the same as the block data a1 having already been stored. In this case, because a Hash value of the block data b1 (a1) becomes the same as the Hash value of the already stored block data a1, the recording and reproducing unit 15 does not newly store the block data b1, and refers to the storing position of the compressed block data a1' obtained by compressing the already stored block data a1 by the same content address CA. Then, when retrieving the block data b1 of the file B, namely, the block data a1 later, it is possible, by referring to the storing position stored in relation with the content address CA, to retrieve the block data a1 (the compressed block data a1') as the block data b1.

Further, the duplication number management unit 14 (a duplication number counting unit) counts, as a duplication number, the number of determinations that block data of a predetermined file having already been stored is the same as block data of another file to be newly stored. Then, the duplication number management unit 14 relates the counted duplication number to each content address referring to block data having already been stored, and stores it into the duplication number storage unit 16. That is to say, the duplication number management unit 14 counts, as a duplication number, the number of times that block data of a predetermined file having already been stored is referred to as block data of another file and stores.

For example, since the block data a1 (the compressed block data a1') shown in FIG. 3B is referred to as the block data b1 of the file B, the duplication number becomes "1" and is stored in relation to the content address CA referring to the block data a1 (a1'). A method for counting the duplication number is not limited to the abovementioned method. For example, the duplication number may be the number of times that block data is referred to. As an example, in the case of the block data a1 (a1') shown in FIG. 3B, the duplication number may be "2" because the block data is referred to by the file A and the file B.

Another function of the recording and reproducing unit 15 (the data management unit) will be described. The recording and reproducing unit 15 has a function of storing block data having already been stored in the HDD 21 to 23, into the SSD 31 to 32 based on the duplication number.

To be specific, firstly, a case in which block data (compressed block data a1') included in files A, B . . . N is referred to by the same content address and stored in the HDD as shown in FIG. 4A will be considered. In this case, when the reference count of the content address of the block data (a1') managed by the duplication number management unit 14 exceeds a preset number (a threshold), the recording and reproducing unit 15 acquires the block data (compressed block data a1') of the storing position referred to by this content address. Then, the recording and reproducing unit 15 determines whether a storage device storing this block data is the HDD 21 to 23 or the SSD 31 to 32. At this moment, in a case that this block data is stored in the HDD 21 to 23 as shown in FIG. 4A, the recording and reproducing unit 15 invalidates the block data (a1') stored within the HDD 21 to 23, for example, so as not to be retrievable as shown by a symbol x in FIG. 4B. Then, the recording and reproducing unit 15 compresses the block data whose duplication number read out before invalidated exceeds the threshold, and stores into the SSD 31 to 32 as shown in FIG. 4B.

At this moment, the recording and reproducing unit 15 does not change a content address referring to a storing position of the block data stored in the SSD 31 to 32 and, as shown in FIG. 2A, changes only data representing a storing position related with the content address and stores into the storing position storage unit 17. Consequently, by referring to a storing position specified by the same content address, it is possible to retrieve the block data (a1') stored within the SSD 31 to 32.

Further, the recording and reproducing unit 15 (the data management unit) also has a function of storing block data to be stored for the first time by distributing into the HDD 21 to 23 or the SSD 31 to 32 depending on the data size or the number of data stored simultaneously. To be specific, firstly, it is assumed that the duplication determination unit 13 determines that the same block data as block data to be newly stored has not been stored yet. In this case, the duplication determination unit 13 compresses the stored block data to be newly stored and checks the data size. At this moment, in a case that the data size of the block data is smaller than a reference size of a preset value, the duplication determination unit 13 stores into the SSD 31 to 32.

Further, even if the data size of the compressed block data is equal to or more than the reference value, the duplication determination unit 13 checks the number of block data to be stored simultaneously. At this moment, in a case that the number of block data to be stored simultaneously is over a reference number of a preset value, the duplication determination unit 13 stores all or part of the block data to be stored simultaneously into the SSD 31 to 32. Then, in another case, namely, in a case that the data size of compressed block data is equal to or more than the reference value, and the number of stored block data is equal to or more than a reference number, the duplication determination unit 13 stores the newly stored block data into the HDD 21 to 23.

[Operation]

Next, an operation of the storage system described above will be described with reference to FIGS. 5 to 7.

Firstly, upon reception of a request for writing a file from the client 4 (step S1), the storage system divides the file into a plurality of block data (step S2). Then, the storage system calculates a Hash value of each of the block data (step S3), and determines whether the same data as the Hash value is already stored. For example, the storage system checks a content address including the Hash value stored in the storing position storage unit 17, and checks whether the same data is stored in a portion corresponding to the Hash value of part of the content address. Then, in a case that the same Hash value exists, the storage system determines that the block data of the same data content is already stored (step S4, Yes at step S5).

On the other hand, in a case that the same Hash value does not exist, the storage system determines that the same block data is not stored yet (step S4, No at step S5). For example, the storage system may store and hold the Hash value of the already stored block data by another method, and this determination may be executed by comparing the stored and held Hash value and the Hash value calculated from the block data to be newly stored.

Subsequently, in the case of determining that the same data as the block data to be newly stored is not stored (No at step S5), the storage system compresses the block data to be newly stored (step S6). Then, the storage system selects a proper storage device (HDD or SSD) to store this compressed block data (step S7), and writes the compressed block data into the selected storage device (step S8). The process of selecting a proper storage device that stores compressed block data (step S7) and the process of writing thereafter (step S8) will be described in detail with reference to a flowchart of FIG. 7.

Firstly, in a case that the data size of the compressed block data is smaller than the value of a reference size (Yes at step S21), the storage system writes this compressed block data into the SSD 31 to 32 (step S25). On the other hand, in a case that the data size of the compressed block data is equal to or more than the value of the reference size (No at step S21), the storage system acquires the number of block data being simultaneously subjected to the writing process at that point (step S22). Then, in a case that the simultaneous writing number is more than a reference number (Yes at step S23), the storage system writes into the SSD 31 to 32. Moreover in a case that the simultaneous writing number is equal to or less than the reference number (No at step S23), the storage system writes into the HDD.

As described above, in this exemplary embodiment, block data to be newly stored that is not a duplicate of block data having already been stored is written into the SSD in a case that the data size thereof is smaller than a set value. Because block data of a small data size is particularly formed by one file in most cases and, when retrieved, the block data may be retrieved together with other data, it is desired that the performance of TAT (Turn Around Time) of I/O (Input/Output) is excellent in such a case. Thus, by writing block data of a small data size into the SSD, which is excellent in TAT performance, it is possible to increase the performance of the storage system.

Further, in a case that the simultaneous writing number is large, that is, a plurality of files are simultaneously written in, block data are located in the storage device in the order of being written in. Therefore, the blocks of the plurality of files are alternately located, and the plurality of block data of the same file may be fragmentized. In a case that the block data are written into the HDD in such a situation, a retrieval speed decreases at the time of a retrieval process later. Therefore, as described above, by writing into the SSD, it is possible to increase a retrieval speed and it is possible to increase the performance of the storage system.

Next, an operation in the case of determining that the same data as block data to be newly stored is stored (Yes at step S5 in FIG. 5) will be described with reference to FIG. 6. Firstly, when block data to be newly stored is already stored and is a duplicate, the storage system does not store the new block data, and executes a process of referring to the block data having already been stored (step S11). Then, the storage system increases the reference count of the block data having already been stored, namely, the duplication number of the block data, and stores and updates in the duplication number storage unit 16 in relation with a content address referring to a storing position of the block data (step S12).

Subsequently, the storage system acquires the updated duplication number from the duplication number storage unit 16 (step S13), and checks whether the duplication number is equal to or more than a preset threshold (step S14). For example, the storage system checks only when the duplication number is updated. Then, in a case that the duplication number is smaller than the threshold value (No at step S14), the storage system ends the process.

On the other hand, in a case that the duplication number is equal to or more than the threshold (Yes at step S14), the storage system checks whether a reference destination of a content address related to this duplication number, namely, block data referred to by this content address is stored in either the HDD 21 to 23 or the SSD 31 to 32 (step S15). For example, the storage system acquires storing position data related to the content address stored in the storing position storage unit 17, and checks a storage device in which the block data is located.

Then, as described above, the storage system stores the block data located in the HDD 21 to 23 (Yes at step S16) of all the block data whose duplication numbers are equal to or more than the threshold, into the SSD 31 to 32. To be specific, firstly, the storage system invalidates the applicable block data stored in the HDD 21 to 23 (step S17). Subsequently, the storage system compresses the applicable block data having been retrieved in advance (step S18), and writes the compressed block data into the SSD 31 to 32 (step S19). The process of invalidating block data in the HDD 21 to 23 and the process of writing block data into the SSD 31 to 32 may be executed in any order, for example, may be executed in the opposite order or simultaneously.

Accordingly, in this exemplary embodiment, because the storage system stores block data referred to by a plurality of files into the SSDs 31 to 32, a speed of retrieving the block data becomes higher compared with when the block data is stored in the HDD to 23. Then, because the block data referred to by the plurality of files is particularly retrieved many times and fragmentized, it is possible to increase the retrieval performance of the whole storage system by storing into the SSD, the retrieval speed of which is high. Moreover, by using both the HDD of a low storage cost and the SSD, it is possible to limit increase of the cost of the whole system. As a result, it is possible to provide a storage system that is low-cost and is capable of increasing the performance.

Although the first storage device is an HDD and the second storage device is an SSD in the above description, the first and second storage devices may be other storage devices, respectively. In this case, it is desirable that a storage device used as the second storage device is lower in unit cost per unit storage capacity and higher in retrieval speed than a storage device used as the first storage device.

<Second Exemplary Embodiment>

A second exemplary embodiment of the present invention will be described with reference to FIG. 8. FIG. 8 is a function block diagram showing a configuration of a storage system. In this exemplary embodiment, the storage system will be schematically described.

As shown in FIG. 8, a storage system 100 of this exemplary embodiment includes a first storage device 111 and a second storage device 112 configured to retrieve stored data at a higher speed than the first storage device.

The storage system also includes: a feature calculation unit 101 configured to calculate feature data based on a data content of storage target data; a data management unit 102 configured to store the storage target data into the first storage device or the second storage device, and manage a storing position of the storage target data based on the feature data calculated from the storage target data; and a duplication determination unit 103 configured to determine whether or not the same storage target data as the storage target data to be newly stored is already stored in the first storage device based on the feature data calculated from the storage target data.

Furthermore, the data management unit 102 is configured to, in a case that the same storage target data as the storage target data to be newly stored is already stored in the first storage device, store the storage target data already stored in the first storage device, into the second storage device.

Further, in the storage system, the data management unit is configured to store, into the second storage device, the storage target data stored in the first storage device based on a number of times of determination by the duplicate determination unit for each of the storage target data already stored in the first storage device.

Further, in the storage system, the data management unit is configured to invalidate the storage target data that has been stored in the first storage device and that is stored into the second storage device.

According to the invention, firstly, when there is storage target data to be newly stored, the storage system calculates feature data based on a data content of the storage target data. Then, the storage system stores the storage target data into the first storage device or the second storage device, and specifies and manages a storing position thereof by using the feature data. Therefore, by referring to the storing position based on the feature data, it is possible to retrieve the stored storage target data.

Further, when newly storing storage target data, the storage system uses the feature data calculated based on the storage target data to determine whether or not the same data as this storage target data is already stored in the first storage device. In a case that the same feature data as the calculated feature data exists, the storage system can determine that the same data as the storage target data to be newly stored is already stored, and therefore, the storage system considers the storage target data stored in the storing position referred to by the feature data as storage target data to be newly stored. In other words, the storage system does not store the storage target data to be newly stored but refers to the already stored storage target data. Consequently, when retrieving the storage target data to be newly stored, the storage system retrieves storage target data referred to by the feature data and is thereby capable of retrieving data of the same content.

Furthermore, when it is determined that the storage target data already stored in the first storage device is the same as the storage target data to be newly stored, the storage system stores the storage target data already stored in the first storage device, into the second storage device. To be specific, in a case that a duplicate number, which is the number of times of determination that the storage target data already stored in the first storage device is the same as the newly stored storage target data, is counted and this duplicate number is more than a preset value, the storage system stores the storage target data stored in the first storage device, into the second storage device. At this moment, the storage system invalidates the storage target data stored in the first storage device.

Thus, because storage target data of the same content as storage target data to be newly stored is stored into the second storage device, when retrieving this new storage target data later, the storage system retrieves the data stored in the second storage device. Therefore, it is possible to increase the retrieving speed. To be specific, storage target data to be newly stored and storage target data whose duplicate number is large will be retrieved many times. By storing into the second storage device as described above, the retrieval speed becomes high, and it is possible to increase the performance of the whole system. Moreover, even in this case, all of the storage target data are not stored in the second storage device, and therefore, there is no need to mount a number of second storage devices whose retrieval speed is high, and it is possible to inhibit increase of the device cost. As a result, it is possible to provide a storage system that can realize increase of the performance.

Further, in the storage system, the data management unit is configured to, in a case that a size of the storage target data to be newly stored is smaller than a preset value, store the storage target data into the second storage device.

Further, in the storage system, the data management unit is configured to, in a case that a preset number of or more storage target data to be newly simultaneously stored exist, store part or all of the storage target data to be simultaneously stored, into the second storage device.

When the size of the storage target data is small, and when there are a number of storage target data to be simultaneously stored, storage target data related to each other may be stored separately from each other. If these data are stored in the first storage device whose retrieving speed is lower than the second storage device, the retrieving speed later decreases. Therefore, as described above, by storing into the second storage device, it is possible to increase the retrieving speed, and it is possible to further increase the performance.

Further, in the storage system, the storage target data is block data obtained by dividing predetermined file data into a plurality of data.

Further, in the storage system, the first storage device is a hard disk drive and the second storage device is a solid state drive (SSD).

Further, although the storage system includes the first storage device and the second storage device, these storage devices may be configured by other devices. That is to say, in a storage device of another embodiment of the present invention, a first storage device and a second storage device configured to retrieve stored data at a higher speed than the first storage device are connected. The storage device includes: a feature calculation unit configured to calculate feature data based on a data content of storage target data; a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data. In the storage system, the data management unit is configured to, in a case that the same storage target data as the storage target data to be newly stored is already stored in the first storage device, store the storage target data already stored in the first storage device, into the second storage device.

Further, in the storage device, the data management unit is configured to store the storage target data stored in the first storage device, into the second storage device, based on a number of times of determination by the duplicate determination unit for each of the storage target data already stored in the first storage device.

Further, the storage device can be realized by installing a program into an information processing device. Specifically, a program of another embodiment of the present invention includes instructions for causing an information processing device in which a first storage device and a second storage device configured to retrieve stored data at a higher speed than the first storage device are connected, to realize: a feature calculation unit configured to calculate feature data based on a data content of storage target data; a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data.

Then, in the program, the data management unit is configured to, in a case that the same storage target data as the storage target data to he newly stored is already stored in the first storage device, store the storage target data already stored in the first storage device, into the second storage device.

Further, in the program, the data management unit is configured to store the storage target data stored in the first storage device, into the second storage device, based on a number of times of determination by the duplicate determination unit for each of the storage target data already stored in the first storage device.

Further, a data management method of another embodiment of the present invention, which is realized by operating the storage system or the storage device, includes: calculating feature data based on a data content of storage target data; and storing the storage target data into a first storage device or a second storage device configured to retrieve stored data at a higher speed than the first storage device, and managing a storing position of the storage target data based on the feature data calculated from the storage target data. The data management method also includes: in the case of newly storing the storage target data, calculating feature data based on a data content of the new storage target data, determining whether or not the same storage target data as the storage target data to be newly stored is already stored in the first storage device based on this feature data and, in a case that the same storage target data as the storage target data to be newly stored is already stored in the first storage device, storing the storage target data already stored in the first storage device into the second storage device.

Further, the data management method includes storing the storage target data stored in the first storage device, into the second storage device, based on a number of times of determination for each of the storage target data already stored in the first storage device whether the storage target data is same as the storage target data to be newly stored.

Inventions of a storage device, a computer program or a data management method having the abovementioned configurations have like actions as the abovementioned storage system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-063904, filed on Mar. 17, 2009, the disclosure of which is incorporated herein in its entirety by reference.

Industrial Applicability

The present invention can be utilized for a storage system equipped with a plurality of storage devices, such as a storage system of a content address type, and has industrial applicability.

DESCRIPTION OF REFERENCE NUMERALS 1 storage device
4 client
11 file division unit
12 Hash calculation unit
13 duplication determination unit
14 duplication number management unit
15 recording and reproducing unit
16 duplication number storage unit
17 storing position storage unit
21, 22, 23 HDD
31, 32 SSD
100 storage system
101 feature calculation unit
102 data management unit
103 duplication determination unit
111 first storage device
112 second storage device

The invention claimed is:

1. A storage system comprising a first storage device and a second storage device configured to retrieve stored data at a higher speed than the first storage device, the storage system also comprising:

a feature calculation unit configured to calculate feature data based on a data content of storage target data;

a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data, wherein the data management unit is configured to, in a case the duplication determination unit determines that the same storage target data as the storage target data to be newly stored is already stored in the first storage device, not store the storage target data to be newly stored, but refer to the storage target data having already been stored in the first storage device as storage target data to be newly stored, and the storage system further comprising:

a duplication number counting unit configured to count a duplication number for each of the storage target data already stored in the first storage device, the duplication number being a number of times of determination by the duplication determination unit that the storage target data is same as the storage target data to be newly stored, wherein:

the data management unit is configured to store the storage target data already stored in the first storage device whose duplication number is more than a preset number, into the second storage device.

2. The storage system according to claim 1, wherein:

the data management unit is configured to store, into the second storage device, the storage target data stored in the first storage device based on a number of times of determination by the duplicate determination unit for each of the storage target data already stored in the first storage device.

3. The storage system according to claim 1, wherein:

the data management unit is configured to invalidate the storage target data that has been stored in the first storage device and that is stored into the second storage device.

4. The storage system according to claim 1, wherein:

the data management unit is configured to, in a case that a size of the storage target data to be newly stored is smaller than a preset value, store the storage target data into the second storage device.

5. The storage system according to claim 1 wherein:

the data management unit is configured to, in a case that a preset number of or more storage target data to be newly simultaneously stored exist, store part or all of the storage target data to be simultaneously stored, into the second storage device.

6. The storage system according to claim 1, wherein:

the storage target data is block data obtained by dividing predetermined file data into a plurality of data.

7. The storage system according to claim 1, wherein:

the first storage device is a hard disk drive and the second storage device is a solid state drive (SSD).

8. A storage device in which a first storage device and a second storage device configured to retrieve stored data at a higher speed than the first storage device are connected, the storage device comprising:

a feature calculation unit configured to calculate feature data based on a data content of storage target data;

a data management unit configured to store the storage target data into the first storage device or the second storage device, and manage a storing position of the storage target data based on the feature data calculated from the storage target data; and a duplication determination unit configured to determine whether or not the same storage target data as the storage target data to be newly stored is already stored in the first storage device based on the feature data calculated from the storage target data, wherein the data management unit is configured to, in a case that the duplication determination unit determines that the same storage target data as the storage target data to be newly stored is already stored in the first storage device, not store the storage target data to be newly stored, but refer to the storage target data having already been stored in the first storage device as storage target data to be newly stored, and the storage device further comprising:

a duplication number counting unit configured to count a duplication number for each of the storage target data already stored in the first storage device, the duplication number being a number of times of determination by the duplication determination unit that the storage target data is same as the storage target data to be newly stored, wherein:

the data management unit is configured to store the storage target data already stored in the first storage device whose duplication number is more than a preset number, into the second storage device.

9. The storage device according to claim 8, wherein:

the data management unit is configured to store the storage target data stored in the first storage device, into the second storage device, based on a number of times of determination by the duplicate determination unit for each of the storage target data already stored in the first storage device.

10. A data management method comprising:

calculating feature data based on a data content of storage target data; and storing the storage target data into a first storage device or a second storage device configured to retrieve stored data at a higher speed than the first storage device, and managing a storing position of the storage target data based on the feature data calculated from the storage target data, the data management method also comprising:

in the case of newly storing the storage target data, calculating feature data based on a data content of the new storage target data, determining whether or not the same storage target data as the storage target data to be newly stored is already stored in the first storage device based on this feature data and, in a case that a determination is made that the same storage target data as the storage target data to be newly stored is already stored in the first storage device, not storing the storage target data to be newly stored, but referring to the storage target data having already been stored in the first storage device as storage target data to be newly stored, and the data management method further comprising:

counting a duplication number for each of the storage target data already stored in the first storage device, the duplication number being a number of times of determination that the storage target data is same as the storage target data to be newly stored, wherein:

the storing the storage target data comprises storing the storage target data already stored in the first storage device whose duplication number is more than a preset number, into the second storage device.

11. The data management method according to claim 10, further comprising:

storing the storage target data stored in the first storage device, into the second storage device, based on a number of times of determination for each of the storage target data already stored in the first storage device whether the storage target data is same as the storage target data to be newly stored.

* * * * *